United States Patent [19]
Nederlof

[11] Patent Number: 5,483,523
[45] Date of Patent: Jan. 9, 1996

[54] RESEQUENCING SYSTEM

[75] Inventor: Leo Nederlof, Antwerp, Belgium

[73] Assignee: Alcatel N.V., Netherlands

[21] Appl. No.: 288,406

[22] Filed: Aug. 10, 1994

[30] Foreign Application Priority Data

Aug. 17, 1993 [EP] European Pat. Off. .............. 93202402

[51] Int. Cl.$^6$ .................................................. H04L 12/56
[52] U.S. Cl. ........................... 370/58.3; 370/60.1; 370/61; 370/94.2
[58] Field of Search .................................. 370/58.1, 58.2, 370/58.3, 60, 60.1, 61, 94.1, 94.2

[56] References Cited

U.S. PATENT DOCUMENTS

| | | | |
|---|---|---|---|
| 5,127,000 | 6/1992 | Henrion | 370/60 |
| 5,173,897 | 12/1992 | Schrodi et al. | 370/60 |
| 5,253,251 | 10/1993 | Aramaki | 370/60 |
| 5,260,935 | 11/1993 | Turner | 370/60 |

FOREIGN PATENT DOCUMENTS

| | | | |
|---|---|---|---|
| 0234859 | 9/1987 | European Pat. Off. | H04L 11/20 |
| 2261799 | 5/1993 | United Kingdom | H04L 12/56 |
| 8400268 | 1/1984 | WIPO | H04L 11/20 |
| 9102419 | 2/1991 | WIPO | H04L 12/56 |

OTHER PUBLICATIONS

'Design and Technology Aspects of VLSI's for ATM Switches' by T R Banniza e.a., IEEE Journal on Selected Areas in Communications, vol. 9, No. 8, Oct. 1991, pp. 1255–1264.

Primary Examiner—Douglas W. Olms
Assistant Examiner—Russell W. Blum
Attorney, Agent, or Firm—Ware, Fressola, Van Der Sluys & Adolphson

[57] ABSTRACT

A resequencing system (DDM, TSG, IC, REG, SUB, RSU) is disclosed for resequencing the cells of a cell stream transmitted through the cascaded connection of a first switching node (SN'), a buffer register (OB) and a second switching node (SN). It includes: a resequencing means (TSG, IC, REG, SUB, RSU) associated to the second switching node (SN), a delay measurement circuit (DDM) associated with the buffer register (OB) and adapted to measure the time delay to which each of said cells is submitted in said buffer register (OB), means to communicate the delay thus measured for each cell to the resequencing means (TSG, IC, REG, SUB, RSU). After said cell has been switched by said second switching node (SN), the resequencing means (TSG, IC, REG, SUB, RSU) submits this cell to a time delay equal to the difference between a predetermined constant time delay value and the communicated delay.

8 Claims, 3 Drawing Sheets

RESEQUENCING SYSTEM

TECHNICAL FIELD

The present invention relates to a resequencing system for resequencing the cells of a cell stream transmitted through the cascaded connection of a first switching node, a buffer register and a second switching node, and including a resequencing means associated with said second switching node.

BACKGROUND OF THE INVENTION

Such a resequencing system is already known in the art, e.g. from the article 'Design and Technology Aspects of VLSI's for ATM Switches' by T. R. Banniza e.a., IEEE Journal on selected areas in communications, Vol. 9, No. 8, October 1991, pp. 1255–1264. Therein the resequencing system includes an input circuit between the buffer register and the second switching node which allocates a time stamp value provided by a time stamp generator to each of the cells applied to an input of the input circuit prior to these cells being switched by the second switching node. After this switching operation has been performed this cell is submitted by a resequencing unit to an additional variable delay which is so chosen that the total delay to which the cell is submitted between the input of the input circuit and an output of the resequencing unit becomes equal to a constant value.

The output buffer temporarily stores the cells switched by the first switching node before forwarding them to the second switching node. Such an output buffer is needed in order to avoid possible output contention occurring when different cells coming from different inputs of the first switching node are switched to the same output of the first switching node within one cell time. Due to this output buffering the cells are subjected to additional non-constant delays, i.e. the cells are subjected to delay jitter.

SUMMARY OF THE INVENTION

An object of the present invention is to provide a resequencing system of the above known type but wherein delay jitter is at least partly eliminated.

According to the invention, this object is achieved due to the fact that said resequencing system further includes a delay measurement circuit associated with said buffer register and adapted to measure the time delay to which each of said cells is submitted in said buffer register, means being provided to communicate the delay thus measured for each cell to said resequencing means which is adapted, after said cell has been switched by said second switching node, to submit this cell to a time delay equal to the difference between a predetermined constant time delay value and said communicated delay.

In this way, the delay jitter caused by the buffer is removed from the output of the resequencing means.

Another characteristic feature of the present invention is that the delay between an output of said buffer register and a switching node input is constant.

In this way, the total delay to which the cells are subjected is equal to the sum of the communicated buffer delay, the constant delay between the buffer register output and the switching node input, and the difference time delay to which the cell is submitted by the resequencing means, i.e. equal to the sum of the constant delay between the buffer register output and the switching node input, and the predetermined constant time delay. Hence, this total delay between an input of the buffer register and an output of the resequencing means is constant and delay jitter is eliminated.

Still a further characteristic feature of the present invention is that it is used in a switching system including an interconnected plurality of resequencing sections each including the cascaded connection of a buffer register and a switching node.

Thus, when the switching system includes several paths from one of its system inputs to one of its system outputs each constituted by an interconnected same plurality of resequencing sections each constituted by the series coupling of a said buffer register and a said switching node, and cells of the same cell stream applied to the latter switching system input may be transmitted via different such paths to the latter switching system output, then resequencing may be done per such resequencing section provided the predetermined constant value is the same for each resequencing section. Indeed, since delay jitter has been eliminated, the total delay for each of the above paths is the same, viz. equal to the product of the number of resequencing sections in the path, which is the same for each path, and the predetermined constant value.

It should be noted that when the number of resequencing sections in a path is not the same for all paths, then the predetermined constant values must be chosen such that the sum thereof over all resequencing sections of a path is the same for all paths.

BRIEF DESCRIPTION OF THE DRAWINGS

The above-mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
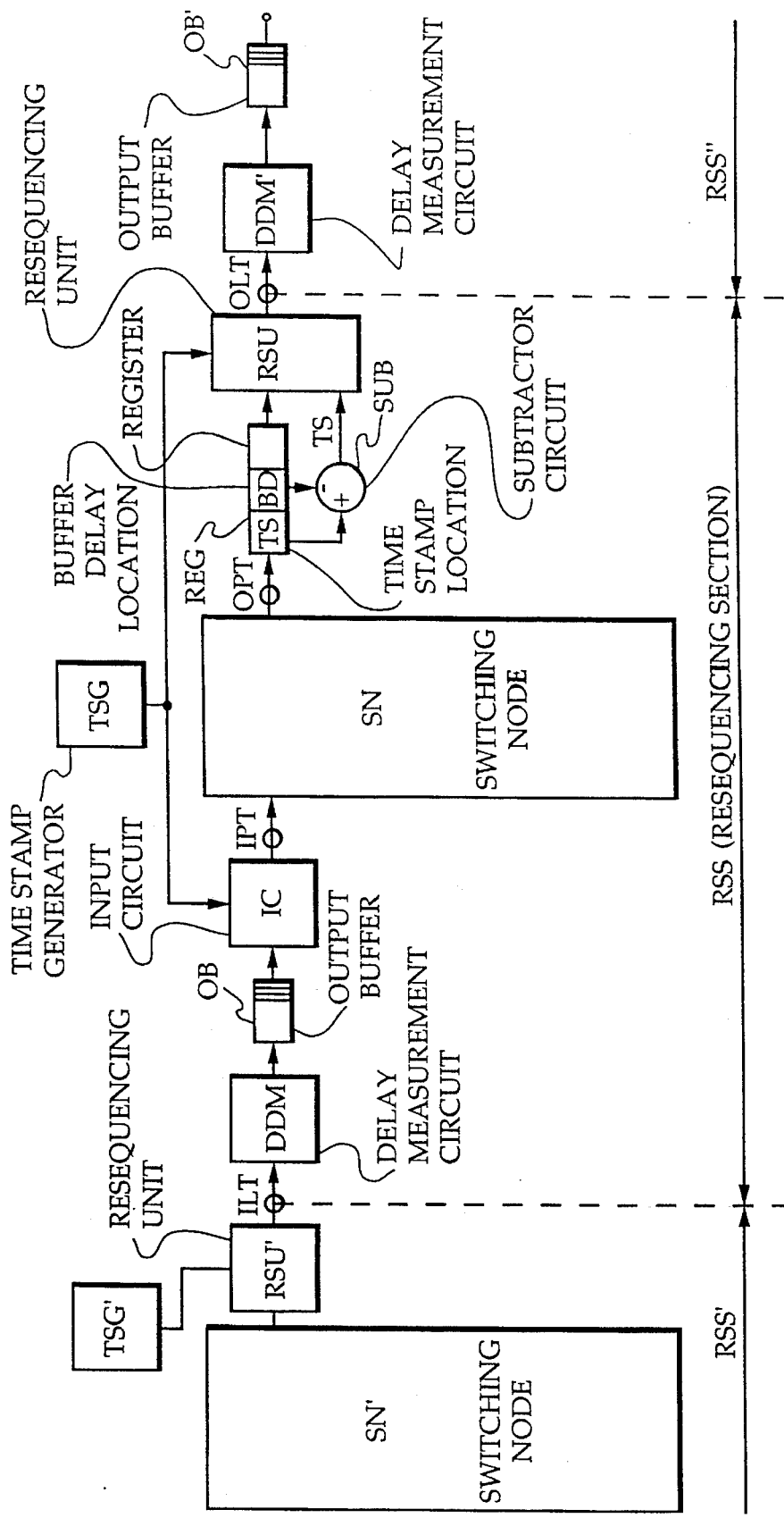
FIG. 1 shows a resequencing section RSS with a resequencing system according to the invention and preceded and followed by parts of resequencing sections RSS' and RSS"

The system shown in FIG. 1 is part of a switching system as for instance the one of FIG. 4 discussed later. It includes the series connection of a switching node SN', a resequencing unit RSU' controlled by a time stamp generator TSG', a resequencing section RSS, a delay measurement circuit DDM' and an output buffer OB'. The resequencing section RSS comprises the cascaded connection between an inlet ILT and an outlet OLT, of a delay measurement circuit DDM, an output buffer OB, an input circuit IC, a switching node SN, a register REG and a resequencing unit RSU. Control inputs of both the input circuit IC and the resequencing unit RSU are connected to an output of a time stamp generator TSG. The switching node SN has a plurality of inputs and outputs of which only an input IPT and an output OPT are shown. The register REG has a time stamp location TS and a buffer delay location BD for storing the contents of a time stamp field and a buffer delay field of a cell stored in REG, respectively. TS is connected to a positive input of a subtractor circuit SUB, and BD is connected to a negative input thereof. The output of SUB is connected to a time stamp input of the resequencing unit RSU.

Figure 2:
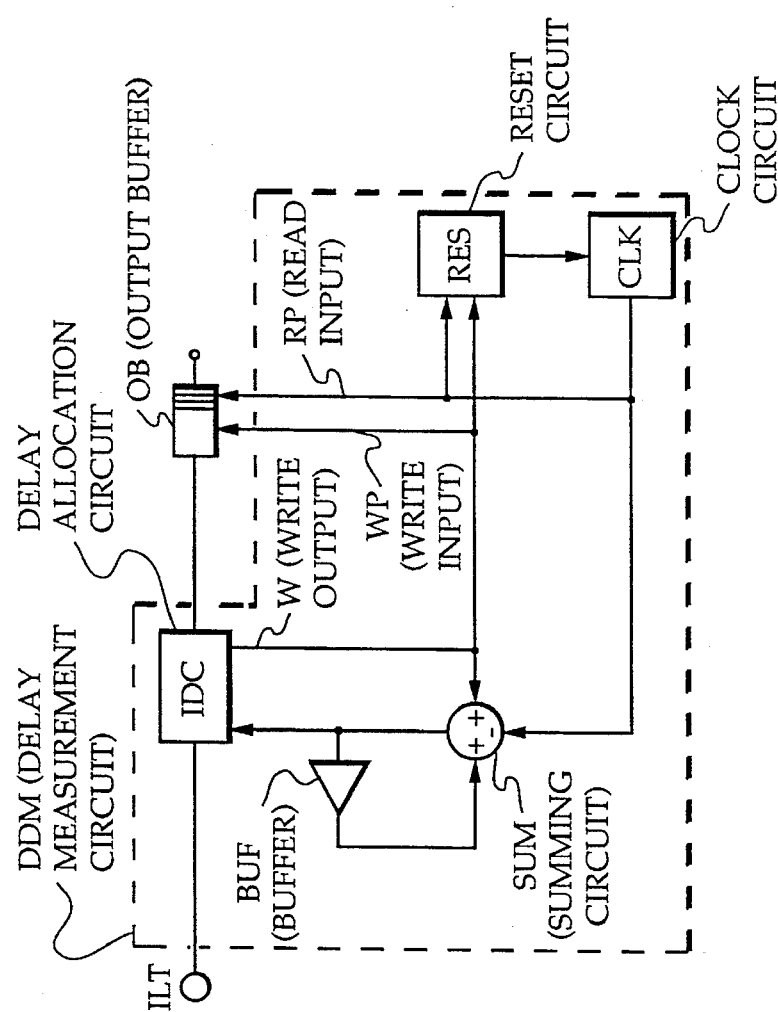
FIG. 2 represents delay measurement circuit DDM in combination with output buffer OB of FIG. 1 in more detail.

The delay measurement circuit DDM in combination with output buffer OB is shown in more detail in FIG. 2. The delay measurement circuit DDM includes a delay allocation circuit IDC, an adder circuit SUM, a buffer BUF, a reset circuit RES and a clock circuit CLK. A cell input and output of the delay allocation circuit IDC constitute an input and an output of the delay measurement circuit DDM, respectively. A delay input of the delay allocation circuit IDC is connected to an output of the adder circuit SUM and via the buffer BUF to a positive input thereof. A write output W of the delay allocation circuit IDC is connected to a write input WP of the output buffer OB and to a second positive input of the adder circuit SUM. An output of the clock circuit CLK is connected to a read input RP of the output buffer OB and to a negative input of the adder circuit SUM. Finally, the read and write inputs RP and WP of the output buffer OB are connected to respective inputs of the reset circuit RES whose output is connected to a reset input of the clock circuit CLK.

Figure 3:
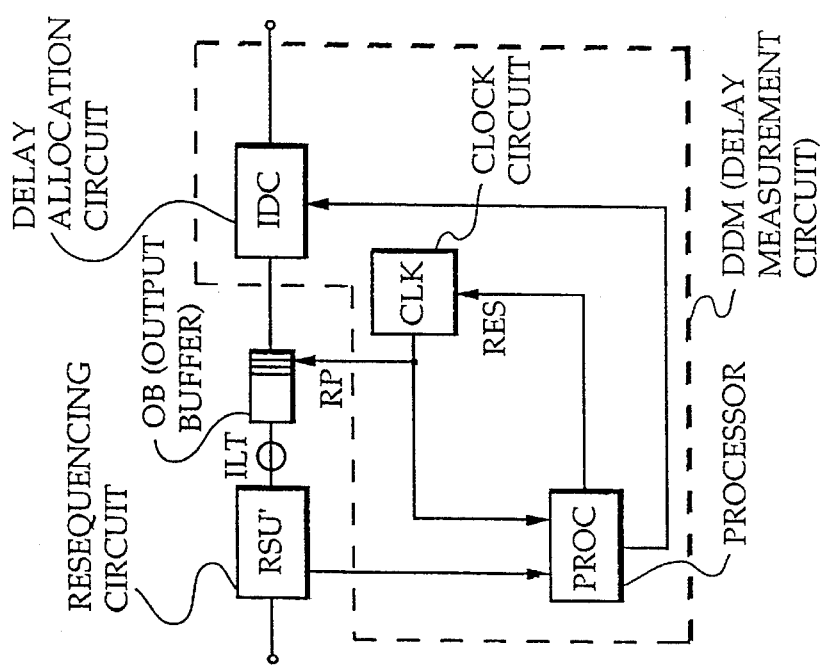
FIG. 3 represents another embodiment of a combination of delay measurement circuit DDM and output buffer OB FIG. 1 in more detail.

A second possible implementation of the delay measurement circuit DDM in combination with the output buffer OB is shown in more detail in FIG. 3. However, therein the delay measurement circuit DDM follows the output buffer OB instead of preceding it and includes a delay allocation circuit IDC, a processor PROC and a clock circuit CLK. A cell input and output of the delay allocation circuit IDC again constitute an input and an output of the delay measurement circuit DDM, respectively. A delay input of the delay allocation circuit IDC is connected to an output of the processor PROC. A time stamp output of the resequencing unit RSU' not belonging to the resequencing section RSS but preceding it, is connected to a first input of the processor PROC. An output of the clock circuit CLK is connected to a read input RP of the output buffer OB and to a second input of the processor PROC. A reset output of the processor PROC is connected to a reset input RES of the clock circuit CLK. This clock circuit CLK is synchronized with the time stamp generator TSG' shown in FIG. 1.

Figure 4:
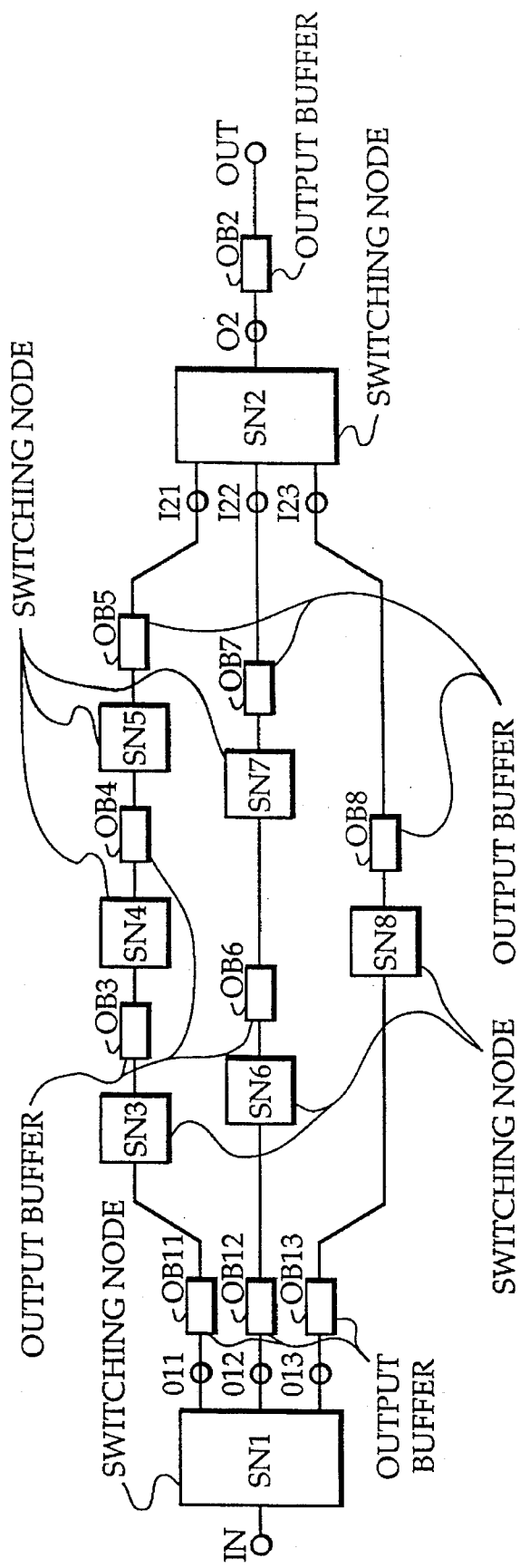
FIG. 4 shows a switching system including a plurality of resequencing sections of the type shown in FIG. 1.

The switching system shown in FIG. 4 includes a first switching node SN1 having a plurality of inputs of which only one, viz. input IN which constitutes an input of the switching system, is shown, as well as a plurality of outputs of which only outputs O11, O12 and O13 connected to respective output buffers OB11, OB12 and OB13 are shown. It further includes a second switching node SN2 having a plurality of inputs of which only the inputs I21, I22 and I23 are shown and a plurality of outputs of which only one, viz. output O2, is shown; this output O2 being connected to an output buffer OB2 whose output constitutes an output OUT of the switching system. Outputs of the output buffers OB11, OB12 and OB13 are coupled to the inputs I21, I22 and I23 via respective first, second and third paths, the first path comprising the cascaded connection of switching node/ output buffer pairs SN3/OB3, SN4/OB4 and SN5/OB5, the second path of the cascaded interconnection of switching node/output buffer pairs SN6/OB6, SN7/OB7, and the third path of the switching node/output buffer pair SN8/OB8. Herein, the first, second and third paths may e.g. form a so-called link group as described in the European patent application EP 91201915.5.

The operation of the switching system is now described with reference to FIGS. 1 to 4.

A cell stream applied to the input IN of the switching system of FIG. 4 is e.g. to be routed to the output OUT thereof. For that purpose, the cells of the cell stream are switched to the outputs of SN1 in such a way that they are distributed over the three outputs O11, O12 and O13. Thus, the cell stream is split into three partial cell streams which are then transmitted to the respective inputs I21, I22 and I23 via the respective first, second and third paths mentioned above. In SN2 the respective partial streams are then switched to the output O2 on which the initial cell stream again appears which then appears on the output OUT after having been buffered in output buffer OB2.

For the switching system just described, resequencing would be performed in the way described e.g. in the published International Patent Application PCT/EP89/00941 (Henrion 17), then the cells of each of the three partial cell streams considered per se would appear in a resequenced way at the output O2, but this would not be so for the combined cell stream at this output. Indeed, when for the above-mentioned first, second and third paths the total delays are different, the partial cell streams are not combined in a correct way. This problem could be solved by an overall resequencing operation, i.e. by allocating time stamp values to the cells of the cell stream before the first switching node SN1 and by resequencing the cells after the second switching node SN2. Indeed, in this way the total delay of all the cells of the cell stream between the input IN and the output O2, whether transmitted via the first, the second or the third path, is equal to the same constant value so that the combination of the partial streams at the output O2 provides a resequenced combined cell stream. However, a drawback of such a solution is that either mutually synchronized time stamp generators must be provided for the first and the second switching nodes respectively, or that time stamp values generated by a same time stamp value generator must be transmitted to both the first and the second switching nodes. Due to the fact that the phases of respective time stamp values allocated to a cell before the first switching node SN1 and provided to the resequencing unit after the second switching node SN2 (not shown on FIG. 4) must be synchronized in a highly accurate way (max phase difference of about 100 nsec) this may in both cases pose problems when the distances between the different switching nodes are long (several kilometers).

By using an embodiment according to the invention, a cell stream is split in different parts at switching node SN1 and then reassembled in a correct way at the output of switching node SN2 without needing to synchronize clocks which are far apart or transmitting time stamp values over long distances. To that end each of the above first, second and third paths is constituted by a plurality of interconnected resequencing sections of the type RSS shown in FIG. 1. The first path includes resequencing sections OB11 to SN3, OB3 to SN4, OB4 to SN5 and OB5 to SN2, the second path includes resequencing sections OB12 to SN6, OB6 to SN7 and OB7 to SN2, and the third path includes resequencing sections OB13 to SN8 and OB8 to SN2. Thus, the total delay between IN and OUT of a cell transmitted via the first path is equal to $dsn1+d11,3+d3,4+d4,5+d5,2+dob2$ where $dsn1$ is the total delay to which the cell is subjected in switching node SN1, $di,j$ is the total delay to which the cell is subjected in the resequencing section constituted by output buffer OBi ($i=11$ to $13$, $3$ to $8$) and switching node SNj ($j=2$ to $8$), and $dob2$ is the total delay to which the cell is subjected in output buffer OB2. The total delay between IN and OUT of a cell transmitted via the second path is equal to dsn1+d12,6+ d6,7+d7,2+dob2, and that via the third path is equal to dsn1+d13,8+d8,2+dob2. Hence, by choosing the delays di,j of the different resequencing sections in such a way that the above three expressions are equal to a predetermined constant overall delay, which is easily done since each of the above delays dsn1 and di,j can be freely chosen, the total delay of each cell of the cell stream transmitted from the input IN to the output OUT is equal to this predetermined constant overall delay. As a consequence the cells appear at the output OUT in a resequenced way independent from the path over which they were transmitted.

As already mentioned, each of the resequencing sections shown in FIG. 4 is of the type represented by RSS in FIG. 1. A cell entering the resequencing section RSS is subjected to a variable buffer delay in the output buffer OB, a variable switching node delay in the switching node SN, and a resequencing delay in the resequencing unit RSU. This resequencing delay is so chosen that the sum of the buffer, switching node and resequencing delays is constant. Therefor, a measure for both the buffer delay and the switching node delay is allocated to each cell applied to the resequencing section RSS.

In the delay measurement circuit DDM the value of the buffer delay is allocated to the cell as now described with reference to FIG. 2. When the operation of the switching system is started the output buffer OB is empty, i.e. its read and write pointers are both zero, and the output of SUM is zero. Each time a new read pointer value RP or write pointer value WP is supplied to OB the output of SUM is recalculated, i.e. set to its previous value which is stored by the buffer BUF, increased or decreased by one for a new write pointer value WP or a new read pointer value RP, respectively. As long as no cell is buffered in OB the reset circuit RES keeps the output of the clock circuit CLK at a constant value, i.e. no clock pulses are then provided by CLK. Also, then the output of SUM is zero so that when a cell is supplied to the inlet ILT the delay allocation circuit IDC writes this zero value in a buffer delay field of the cell, and then provides a new write pointer value WP for the output buffer OB pointing to the address of a memory location of OB wherein this cell has to be written, i.e. this write pointer value WP points to the first memory location of OB. Then the output of SUM is recalculated as indicated above and becomes equal to one, viz. the previous value (zero) plus one. In this way, the value at the output of SUM is written in the buffer delay field of a cell arriving at the inlet ILT whereupon this cell is written in the output buffer OB and a new value is calculated for the output of SUM. On the other hand, when the output buffer OB is not empty, at each tick of the clock circuit CLK a new read pointer value RP for the output buffer OB is calculated (previous read pointer value RP plus one), and applied to OB and to the negative input of SUM. A cell is then read from OB and forwarded to the input circuit IC, and the output of SUM is recalculated as indicated above (previous output minus one). Thus, as the output buffer OB is periodically read at the rate of the clock circuit CLK (except when the read and write pointer values are equal in which case the buffer delay is zero since the buffer is empty) and as in the buffer delay field of each cell the number of cells buffered in OB at cell arrival is written, this number of cells is a measure for the buffer delay to which the cell is subjected in the output buffer OB and this buffer delay is determined with an accuracy of within one clock period of CLK. It should be noted that when the output buffer OB is full the cell can not be written therein and will be discarded.

A more accurate measurement of the buffer delay may be performed by the circuit shown in FIG. 3 wherein, as already mentioned, the output buffer OB precedes the delay measurement circuit DDM. As described in the above mentioned International Patent Application, a cell which is output from the resequencing unit RSU' is output upon the occurrence of a precalculated time stamp value provided by the time stamp generator TSG'. This precalculated time stamp value thus indicates when the cell is output from the resequencing unit RSU' and enters the output buffer OB. When the operation of the switching system is started the output buffer is empty and the output of the processor PROC is initialized to zero. As long as the output buffer OB is empty, the reset output of the processor PROC keeps the output of the clock circuit CLK at a constant value, i.e. no clock pulses are then provided by CLK. When a cell is now output from the resequencing unit RSU', the corresponding precalculated time stamp value is applied to PROC and stored in a small (not shown) memory included therein, and the cell is written in the output buffer OB. For each next cell of the cell stream output from the resequencing unit RSU' the corresponding precalculated time stamp value is applied to PROC and stored in the small memory included therein. As long as the output buffer OB is not empty, at each tick of the clock circuit CLK a new read pointer value RP is calculated (previous read pointer value RP plus one) and provided to the output buffer OB and to the processor PROC. A cell is then read from OB and forwarded to the delay allocation circuit IDC. Since the clock circuit CLK is synchronized with the time stamp generator TSG', the value provided by the clock circuit CLK (i.e. the read pointer value RP) is also a measure for the time the cell is read from the output buffer OB. By subtracting the precalculated time stamp value corresponding to the forwarded cell from this value provided by CLK the buffer delay to which the cell was subjected in the output buffer OB is obtained. The latter value is then applied to the delay allocation circuit IDC and written in the buffer delay field of the cell before this cell is transmitted to the input circuit IC. It should be noted that in this way the output buffer OB may be combined with a resequencing buffer included in the resequencing unit RSU'. It should also be noted that both the time stamp values provided by TSG' and the pointer values provided by CLK may be derived from the same clock in which case no synchronization of TSG' and CLK is needed.

When the cell arrives at the input circuit IC a time stamp value then provided by the time stamp generator TSG is written in a time stamp field of the cell, as described in the already mentioned International Patent Application. The cell is then forwarded to the input IPT of the switching node SN wherein it is switched to the output OPT where it is stored in the register REG preceding the resequencing unit RSU. The contents of the time stamp and buffer delay fields of this cell are first read from the time stamp and buffer delay locations TS and BD of the register REG, respectively, and the buffer delay is then subtracted from the time stamp value in the subtractor SUB, the difference being supplied to the resequencing unit RSU. In this resequencing unit RSU the cell is buffered until the time stamp generator TSG provides a time stamp value equal to the sum of a predetermined constant value and the last mentioned difference.

In another embodiment, the buffer delay is already subtracted from the time stamp value in the input circuit IC. In that case, this difference is written in the time stamp field of the cell and no buffer delay field is needed as the buffer delay is transmitted from the delay measurement circuit DDM to the input circuit IC in the time stamp field of the cell. In that case, the register REG and subtractor SUB between the output OPT and the resequencing unit RSU are omitted and the function of the subtractor circuit SUB is performed in the input circuit IC. The cell is then buffered in the resequencing unit RSU until the time stamp generator TSG provides a time stamp value equal to the sum of the predetermined constant value and the value written in the time stamp field of the cell.

As the cell is only output from the resequencing unit RSU when TSG provides a time stamp value equal to the time stamp value minus the buffer delay value plus the predetermined constant value, the total delay to which the cell is subjected between the inlet ILT and the outlet OLT of the resequencing section RSS is equal to this predetermined constant value plus the transmission line delay to which the cell is subjected between the output of the output buffer OB (or of the delay measurement circuit in case of the implementation of FIG. 4) and the input of the input circuit IC, this latter transmission line delay being constant. Hence, the total delay to which the cell is subjected in the resequencing section RSS is constant and so-called delay jitter, i.e. delay varying slightly from cell to cell, is eliminated. When the transmission line delay is known, the total delay over the resequencing section RSS is also known, whereby the resequencing sections of the switching system shown in FIG. 4 can be so designed that the delay across the different paths is equal.

While the principles of the invention have been described above in connection with specific apparatus, it is to be clearly understood that this description is made only by way of example and not as a limitation on the scope of the invention.

I claim:

1. A resequencing system (DDM, TSG, IC, REG, SUB, RSU) for resequencing cells of a cell stream transmitted through a cascaded connection of a first switching node (SN'), a buffer register (OB) and a second switching node (SN), and including a resequencing means (TSG, IC, REG, SUB, RSU) associated with said second switching node (SN), characterized in that said resequencing system (DDM, TSG, IC, REG, SUB, RSU) further includes a delay measurement circuit (DDM) connected to said buffer register (OB), the delay measurement circuit (DDM) having means for measuring a respective buffer time delay to which each of said cells is subjected in said buffer register (OB), means for providing the respective buffer time delay thus measured for each cell to said resequencing means (TSG, IC, REG, SUB, RSU), the resequencing means (TSG, IC, REG, SUB, RSU), after each cell has been switched by said second switching node (SN), subjecting each cell to a corresponding resequencing time delay equal to the difference between a predetermined constant time delay value and said respective buffer time delay.

2. A resequencing system according to claim 1, characterized in that said delay measurement circuit (DDM) writes said respective buffer time delay in a buffer delay field thereof prior to said cell being transmitted to said resequencing means (TSG, IC, REG, SUB, RSU), thereby communicating said measured delay thereto.

3. A resequencing system according to claim 1, characterized in that said resequencing means (TSG, IC, REG, SUB, RSU) includes:

a time stamp generator (TSG) for generating successive time stamp values, a subtractor circuit (SUB), responsive to said successive time stamp values, and further responsive to respective buffer time delays, for subtracting, for each cell of said cell stream, said respective buffer time delay from a successive time stamp value provided by said time stamp generator (TSG) upon receipt of each cell on a switching node input (IPT) of the second switching node (SN), for providing an adapted time stamp value, a resequencing unit (RSU) coupled between an output (OPT) of said second switching node (SN) and a resequencing system outlet (OLT) for allowing each cell to be supplied to said outlet (OLT) only when said time stamp generator (TSG) generates a second time stamp value equal to a sum of said adapted time stamp value and said predetermined constant time delay value.

4. A resequencing system according to claim 3, characterized in that said resequencing means (TSG, IC, REG, SUB, RSU) further includes an input circuit (IC) coupled between said buffer register (OB) and the switching node input (IPT) of the second switching node (SN) for allocating to cells received thereon said time stamp value then provided by said time stamp generator (TSG), and said subtractor circuit (SUB) is coupled between said output (OPT) and said resequencing unit (RSU).

5. A resequencing system according to claim 3, characterized in that said resequencing means (TSG, IC, REG, SUB, RSU) further includes an input circuit (IC) coupled between said buffer register (OB) and the switching node input (IPT) of the second switching node (SN) and to which said subtractor circuit (SUB) is coupled, for allocating to cells received on said input (IPT) said adapted time stamp value.

6. A resequencing system according to claim 1, characterized in that the time delay to which a cell is subjected when being transferred from an output of said buffer register (OB) to a switching node input (IPT) of the second switching node (SN) is constant.

7. A resequencing system according to claim 6, characterized in that the resequencing system is used in a switching system including an interconnected plurality of resequencing sections (OB11/SN3, OB3/SN4, OB4/SN5, OB5/SN2; OB12/SN6, OB6/SN7, OB7/SN2; OB13/SN8, OB8/SN2), each including the cascaded connection of a respective buffer register and a respective switching node.

8. A resequencing system according to claim 1, characterized in that said cells are transmitted from said buffer register (OB) to a switching node input (IPT) of the second switching node (SN) at a constant rate, and that said respective buffer time delay allocated to a said cell is a function of the number of cells present in said buffer register (OB) when said cell is supplied to an input of said buffer register.

\* \* \* \* \*